United States Patent
Wahlberg

(10) Patent No.: US 6,385,901 B1
(45) Date of Patent: May 14, 2002

(54) THREE PANEL TOMATO OR VEGETABLE SUPPORT CAGE

(75) Inventor: Roger N. Wahlberg, 1174 Atlantic Dr. NW., Atlanta, GA (US) 30319-5312

(73) Assignee: Roger N. Wahlberg, Atlanta, GA (US)

( * ) Notice: Subject to any disclaimer, the term of this patent is extended or adjusted under 35 U.S.C. 154(b) by 0 days.

(21) Appl. No.: 09/305,805

(22) Filed: May 4, 1999

(51) Int. Cl.[7] ............................................. A01G 17/06
(52) U.S. Cl. .......................................... 47/45; 256/47
(58) Field of Search .................... 47/44, 45; 256/32, 256/47, 25; 43/6

(56) References Cited

U.S. PATENT DOCUMENTS

| | | | |
|---|---|---|---|
| 9,642 A | * | 3/1853 | Walker, Sr. et al. |
| 1,182,018 A | * | 5/1916 | Koenig ........................ 256/25 |
| 2,152,816 A | * | 4/1939 | Olson |
| 3,041,783 A | * | 7/1962 | Pezdek et al. |
| 3,423,072 A | * | 1/1969 | Bernstein |
| 3,793,771 A | * | 2/1974 | Slaughter ...................... 47/44 |
| 4,022,436 A | * | 5/1977 | Thomas .................... 47/47 X |
| 4,073,091 A | * | 2/1978 | Vogel ............................. 47/45 |
| 4,285,163 A | * | 8/1981 | Booker, Jr. ..................... 47/45 |
| 4,595,176 A | * | 6/1986 | Crabtree .................... 256/47 X |
| 5,174,060 A | * | 12/1992 | Glamos ......................... 47/45 |
| 5,179,799 A | * | 1/1993 | Hullestad ....................... 47/45 |
| 5,544,446 A | * | 8/1996 | Benson, Jr. ..................... 47/45 |
| 5,718,414 A | * | 2/1998 | Deloach et al. ........... 256/47 X |
| 6,092,792 A | * | 7/2000 | Camara ....................... 256/24 |

* cited by examiner

Primary Examiner—Peter M. Poon
Assistant Examiner—Jeffrey L. Gellner

(57) ABSTRACT

A plant support cage apparatus is set forth wherein two or more panels of rectangular shape are joined on the vertical edges by a series of coil cavity and corresponding rod connections alternated by hook restraints. Unit thus formed when the plurality of the panels is fully joined together is a cylindrical cage. All connections made at the vertical edges of the panels are formed from and are part of the panel lattice. The unit is rigid as a separate unit and stable when pressed in the ground by the stakes that are extensions also part of the vertical members of the lattice. The cage can be enlarged or contracted by the addition of panel units. It is easily assembled and dissembled without special tools and compactly stacked by nesting of the sections.

3 Claims, 4 Drawing Sheets

THREE PANEL TOMATO OR VEGETABLE SUPPORT CAGE

CROSS-REFERENCE TO RELATED APPLICATION

This application claims priority to U.S. provisional application entitled, "Three Panel Tomato or Vegetable Support Cage," having Ser. No. 60/084,215, filed May 5, 1998, which is entirely incorporated herein by reference.

BACKGROUND OF THE INVENTION

1. Field of the Invention

The present invention relates to plant cages, and more particularly pertains to a new and improved plant cage apparatus selectively expandable to accommodate plant growth, and are sturdy and stackable.

2. Background-Description of Prior Art

The desirability of rigid sturdy cage has been sought aft for many years by serious gardeners. The ability to break them down in a few pieces for transportability and storage is a very desirable feature. But the combination of these two has been rare, A common plant support in use today is conrtructed from a single section of concrete reinforcement wire having a square or rectangular wire lattice construction. The plant support is formed by bending a section of the reinforcement wire into a cylinder-shape and attaching the ends together with the wire to form a finished plant support cage. However, at the end of the season, these plant supports are generally left intact and stored side-by-side as separate cages, since these plant supports cannot be nested. Thus a large storage area is required for such supports. The multiplicity or plurality of panels is a feature of this invention that overcomes this problem.

This common single section support does provide the rigidity of the unit that is desired as apposed to a flimsy unit. This rigidity provides for easy handling for moving or setting up or staking it in the soil. Yet it is necessary, as well, to have a large diameter of staking support to provide vertical stability. This along with the rigidity will give a high load bearing capability for on and off center loads, required by heavy produce producing plants, as most tomatoes plants.

For example, a popular plant supports sold on the market today is often called a "cone cage". It comprises circular supports having three (3) or four (4) tapered vertical support wires having lower free ends that together are imbedded into the ground during usage and three (3) or four (4) horizontal cross wires welded or otherwise attached to the vertical support wires. This popular support suffers nesting difficulties due to the free ends being bent during insertion into the ground and remain bent after removal at the end of the season. Further, the extreme taper required for nesting seriously reduces the good stability of the unit needed when inserted in the ground and the small diameter of the lower horizontal wires is generally insufficient to properly enclose and support the lower branches of the plant. Also, the resulting frictional and interference contact of the units thus nested makes it difficult to remove a unit from a nested stack of units. In contrast the present invention has high stability when inserted into the ground and provides for lower branch support. Hillerstad U.S. Pat. No. 5,179,799 is an example of a variation of this variety. Some require stakes as Benson U.S. Pat. No. 5,544,446 or have only a few number of support members Hillerstad Benson, Brown U.S. Pat. No. 5,048,231 and thus reducing stability when planted. The said invention has numerous support stakes. Nested storage is a favorable feature, provided by the provided by the invention. It is more favorable than flat staking.

It is desirable to expand the unit for the plant requirement. Risler U.S. Pat. No. 4,894,951 does not the pieces of assembly are too numerous for most gardeners. As well, Benson, Hillestad and Allman U.S. Pat. No. 5,323,559. The said Invention has a few number of identical, interchangeable sections. Thus with the plurality of large interchangeable panels, rigidity of assemblage, large diameter support ring, nested storage and portability, and expandability of this invention is what is serious gardeners have been asking for and looking for quite some time.

BRIEF SUMMARY OF THE INVENTION

In view of the foregoing disadvantages inherent in the known types of plant cage apparatus now present in the prior art, the present invention provides a plant cage apparats wherein the same is provided with panel members to quickly assemble and disassemble provide rigidity to the unit and accommodate expansion or contraction of the plant cage apparatus to accommodate associated plant development and may be compactly stored when not in use. As such, the general purpose of the present invention, which will best describe greater detail, is to provide a new and improved plant cage apparatus which has all the advantages of the prior art plant cage apparatus and none of the disadvantages. To attain this, th present invention comprises plurality of e panels or sections vertically oriented wherein the vertical edges of the panels members are secured by connector members slidingly thereto to expansion or contraction of the assembled apparatus.

This invention resides not in any one of these features but rather in the particular combination of all of them herein disclosed and claimed and it is distinguished from the prior art in this set forth combination of all of its structures for the functions specified panels or sections vertically oriented.

It is another object of the present invention to provide a new and improved plant cage apparatus, which may be easily and efficiently manufactured and marketed. It is an improved plant cage apparatus, which is of a durable and reliable construction.

An even further object of the present invention is to provide a new and improved plant cage apparatus which is susceptible of a low cost of manufacture with regard to both materials and labor, and which accordingly is then susceptible of low prices of sale to the consumer thereby making such plant cage apparatus economically available to the buying public. Still yet another object of the present invention is to provide a new and improved plant cage apparatus which provides in the benefits and methods of the prior art some of the advantages thereof, while simultaneously overcoming some of the disadvantages normally associated therewith.

DETAILED DESCRIPTION OF THE INVENTION

The invention is a tomato or vegetable cage that can be put together very quickly into a rigid cylindrical structure from separate, for example, three identical sections of wire mesh (such as cut and formed from a roll of concrete reinforcing wire mesh) with common tools or machinery using no separate connections, instead the invention uses a unique series of attachments of wire ends inserted into coil cavities and of hooks over wires creating latches formed entirely of the wire mesh of the sections.

The cage thus formed has great rigidity from the spring tension of the sections as the springiness of the wire presses outward against the coil cavity connections and pulls against the restraining latches. In addition, the large diameter of the base ring give it great vertical stability after it is pressed into the soil.

Upon completion of uses, the cage can e quickly disassembled in separate sections for easy storage in a small fraction of the space taken up by a cylindrical cage without sections.

The great rigidity of this invention combined with the ease of assembly and disassembly form compact storage is a great improvement over similar bulky and difficult to store cylindrical tomato cages in common use formed of one section of wire, which clutter many a garden after the growing season. Likewise it is a great improvement over cages that can be disassembled by which are make of the panels with lose connections.

Figure 1:
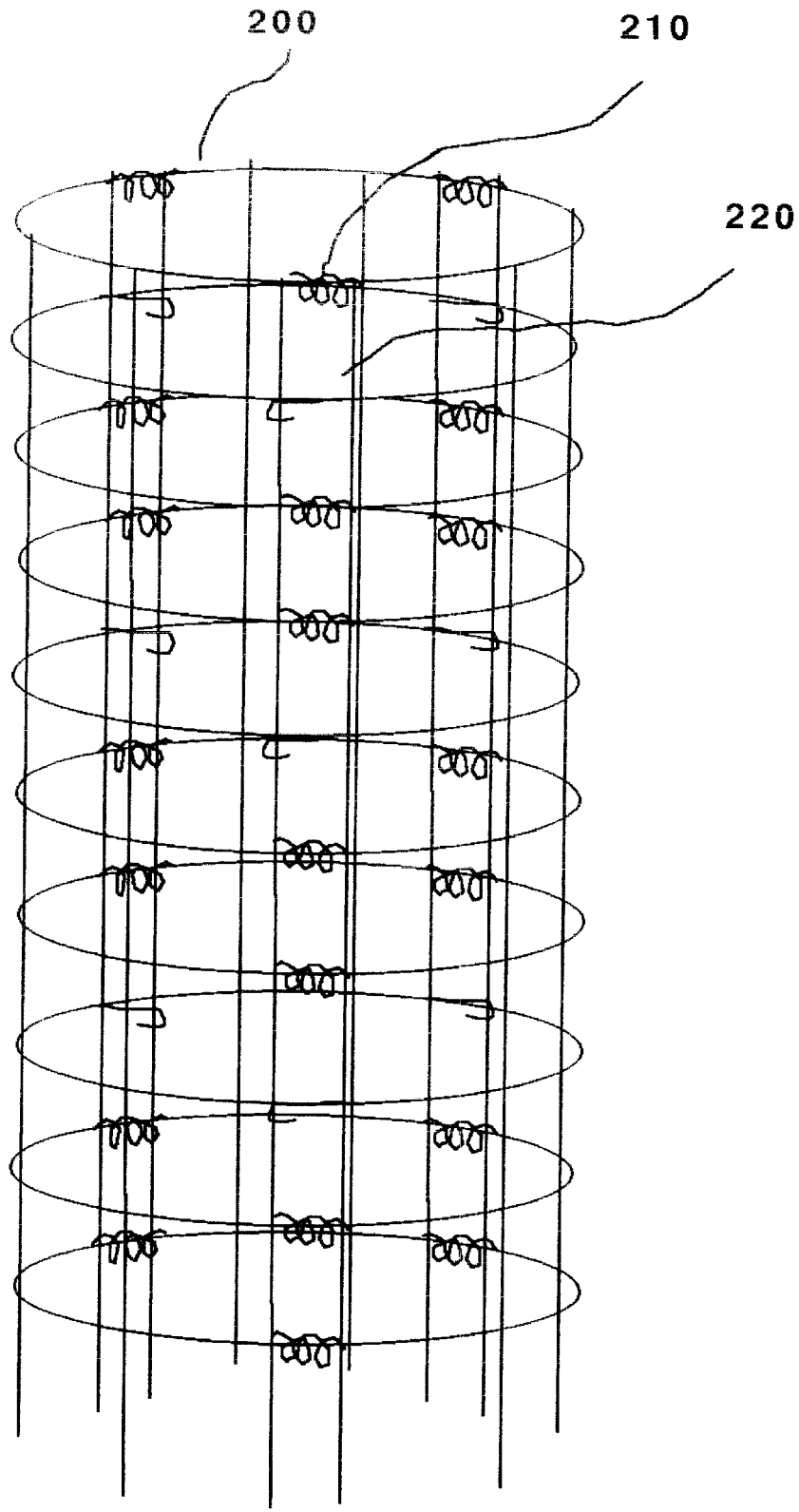
FIG. 1 is an isometric illustration of the invention.
Figure 2:
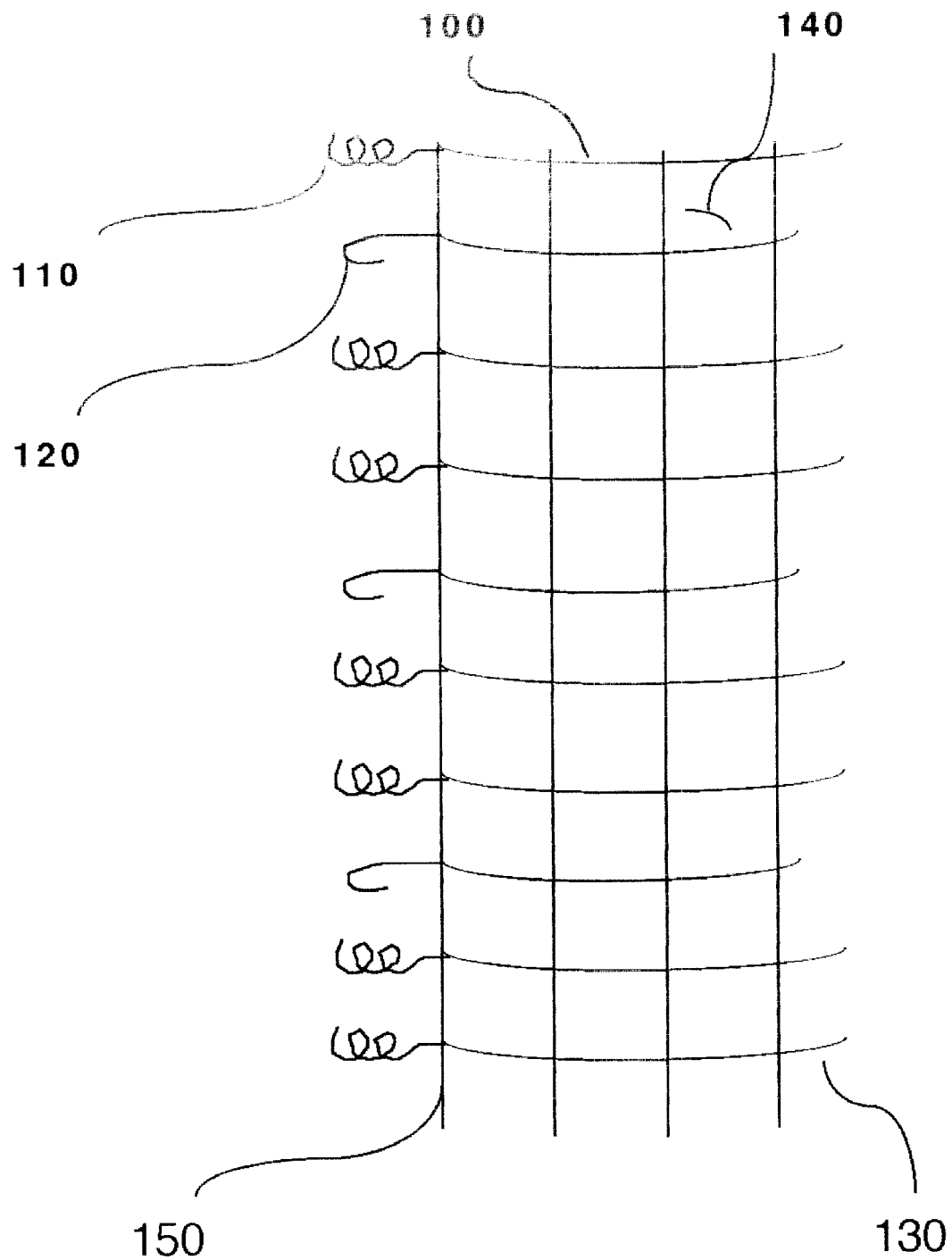
FIG. 2 is an isometric illustration of a single panel unit.
Figure 3:
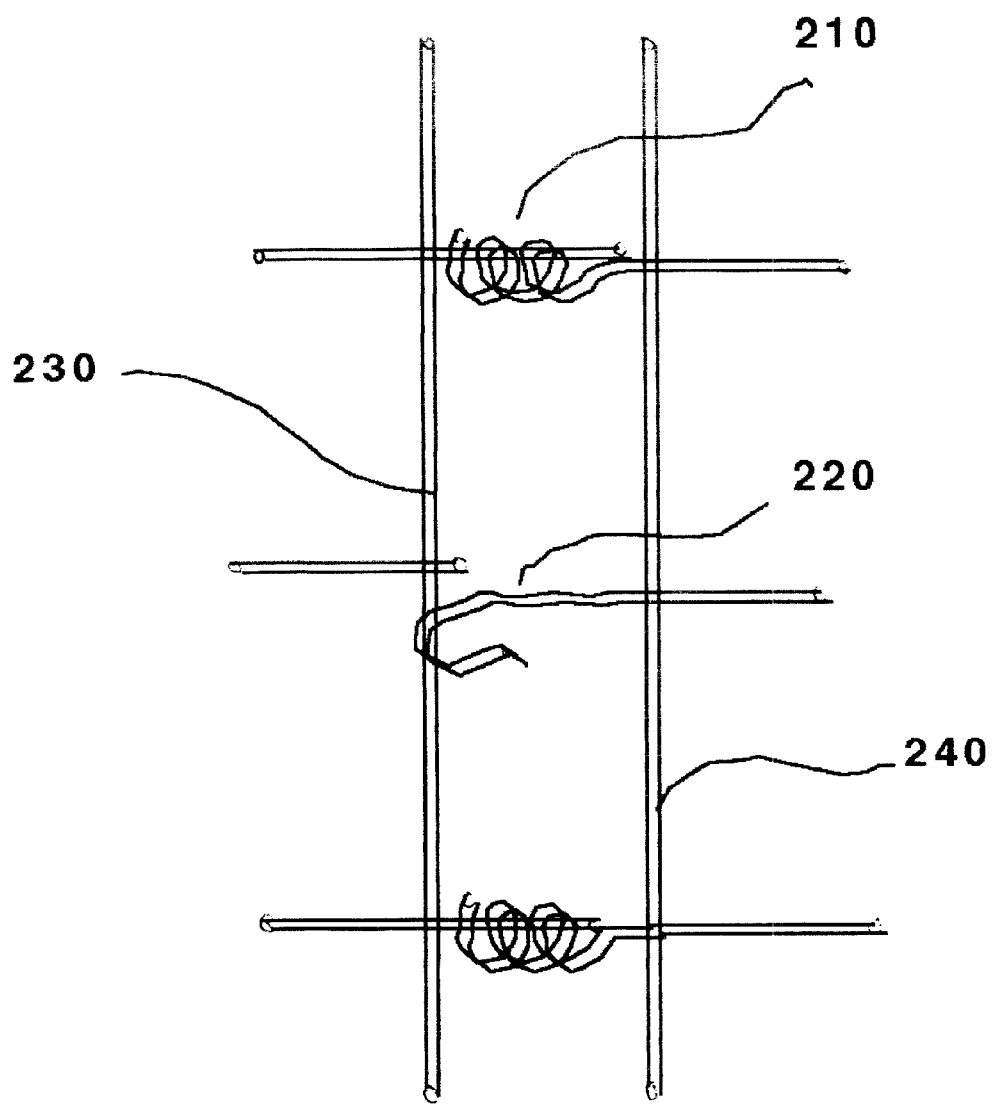
FIG. 3 is an isometric illustration of the typical vertical edge connection of two panel units.
Figure 4:
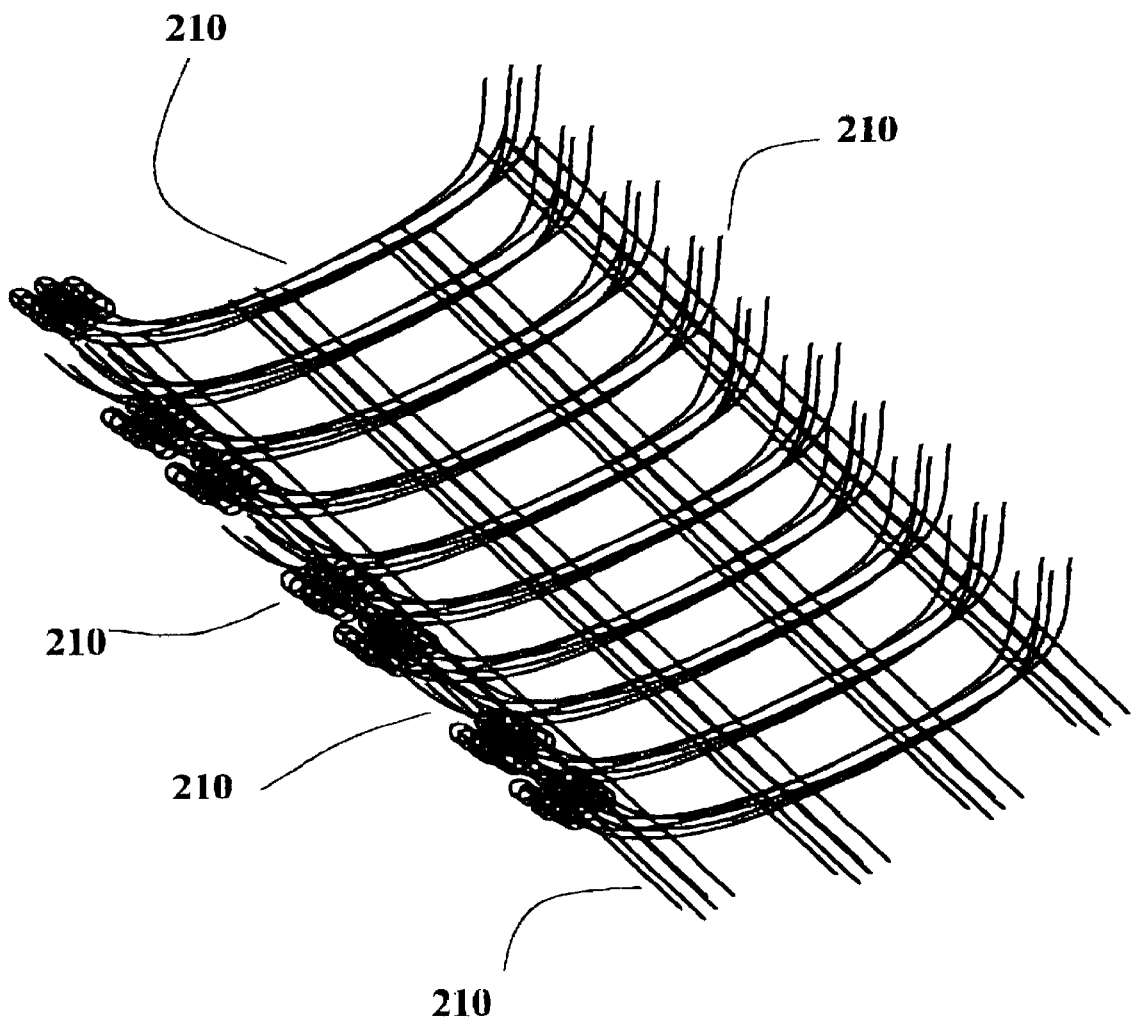
FIG. 4 is an isometric illustration of a series of slightly curved plant cage organizations in a stacked and nested arrangement.

A preferred embodiment of the cylindrical tomato or vegetable support cage invention 200 shown in FIG. 1, comprises three identical and thus interchangeable shallow arched wire lattice sections or panels 100 shown in FIG. 2, of homogenous aperture suture 140, with a unique attachment system for joining of the left vertical edge 230 of one section to the right vertical edge of another section 240 shown in FIG. 3. This is done with slightly loose slide fit connections 210 of straight rods 130 into coiled cavities 110 and that connection being retained 220 to make the latch connections of moving the right edge 230 toward the left edge 240 to make the latch connections of u-formed hooks 120. The final step of completing closure of the cylinder cage is made by joining the two unattached vertical edges of the section in a similar manner. The cage thus formed has the advantage over its competitors of structural rigidity, upright stability, cylindrical shape, easy placement and removal of the base rods 150 into the soil medium to make it secure, rapid assembly and disassembly, efficient transportability of tree closely nested identical sections 100, and thus efficient multiple unit stacking of sections for seasonal storage FIG. 4.

What is claimed is:

1. A plant support comprising:

(a) two or more connected panels, each one of said connected panels constructed in the form of a lattice and including vertical edges and vertical support structures integral to said panels whereby each vertical member of the lattice can be driven into the ground to an fixed depth; and (b) connecting means adjacent said vertical edges of said connected panels for holding said connected panels together to disallow freedom of motion between two adjacent panels, wherein said connecting means are a plurality of coil cavities formed from horizontal members of the lattice and corresponding projection extensions from horizontal members of the lattice along each said vertical edge with alternate hook connections formed from horizontal members of the lattice whereby said panels can be joined to form a cage to enclose a desired area or separated whereby each said unconnected panel can be stacked or nested for storage and shipping.

2. The plant support of claim 1, wherein apertures in said connected panels are of predetermined size whereby fruit and/or vegetables can be harvested, plants maintained, and the enclosed plants and their produce are protected from predators.

3. The plant support of claim 1, wherein said vertical support structures are vertical rods integral to the lattice of the panels.

* * * * *